(12) United States Patent
Nava Rudiger et al.

(10) Patent No.: US 12,353,195 B2
(45) Date of Patent: Jul. 8, 2025

(54) SYSTEM AND METHOD FOR SELECTING AN OPHTHALMIC LENS MANUFACTURING PROCESS

(71) Applicant: ESSILOR INTERNATIONAL, Charenton-le-Pont (FR)

(72) Inventors: Enrique Nava Rudiger, Charenton-le-Pont (FR); Jean-Marc Padiou, Charenton-le-Pont (FR)

(73) Assignee: Essilor International, Charenton-le-pont (FR)

( * ) Notice: Subject to any disclaimer, the term of this patent is extended or adjusted under 35 U.S.C. 154(b) by 780 days.

(21) Appl. No.: 17/622,084

(22) PCT Filed: Jun. 23, 2020

(86) PCT No.: PCT/EP2020/067519
§ 371 (c)(1),
(2) Date: Dec. 22, 2021

(87) PCT Pub. No.: WO2020/260292
PCT Pub. Date: Dec. 30, 2020

(65) Prior Publication Data
US 2022/0252902 A1 Aug. 11, 2022

(30) Foreign Application Priority Data
Jun. 24, 2019 (EP) .................................... 19305822

(51) Int. Cl.
*G05B 19/41* (2006.01)
*G05B 19/4099* (2006.01)
(Continued)

(52) U.S. Cl.
CPC ....... *G05B 19/418* (2013.01); *G05B 19/4099* (2013.01); *B33Y 50/00* (2014.12)

(58) Field of Classification Search
CPC .. G05B 19/418; G05B 19/4099; B33Y 50/00; B29D 11/00423; B29D 11/00009; B29D 11/00961; G06Q 50/04
See application file for complete search history.

(56) References Cited

U.S. PATENT DOCUMENTS

| 2016/0101573 A1 | 4/2016 | Quere et al. |
| 2016/0209819 A1 | 7/2016 | Cudak et al. |
| (Continued) | | |

OTHER PUBLICATIONS

Extended European Search Report for EP Application No. 19305822.9 dated Dec. 9, 2019, 9 pages.
(Continued)

*Primary Examiner* — Christopher W Carter
(74) *Attorney, Agent, or Firm* — NIXON & VANDERHYE (57) ABSTRACT

This system for selecting at least one ophthalmic lens manufacturing process to be used for manufacturing an ophthalmic lens, the manufacturing including additive manufacturing, includes at least one processor configured to determine in an automated manner, on the basis of a set of input data, at least two ophthalmic lens manufacturing processes differing by at least one manufacturing operation, which can be used for manufacturing the ophthalmic lens. It further includes at least one processor configured to select at least one ophthalmic lens manufacturing process to be used for manufacturing the ophthalmic lens, among the determined at least two ophthalmic lens manufacturing processes.

17 Claims, 2 Drawing Sheets

(51) Int. Cl.
    *G05B 19/418*    (2006.01)
    *B33Y 50/00*     (2015.01)

(56)            References Cited

U.S. PATENT DOCUMENTS

2017/0368742  A1*  12/2017  Slep ................. B29D 11/00009
2018/0001581  A1    1/2018  Patel et al.
2018/0065329  A1*   3/2018  Oag ................. B29D 11/00067
2018/0267518  A1    9/2018  Hassman

OTHER PUBLICATIONS

International Search Report for PCT/EP2020/067519 dated Aug. 28, 2020, 4 pages.
Written Opinion of the ISA for PCT/EP2020/067519 dated Aug. 28, 2020, 7 pages.

* cited by examiner

SYSTEM AND METHOD FOR SELECTING AN OPHTHALMIC LENS MANUFACTURING PROCESS

CROSS-REFERENCE TO RELATED APPLICATIONS

This application is the U.S. national phase of International Application No. PCT/EP2020/067519 filed Jun. 23, 2020 which designated the U.S. and claims priority to European Patent Application No. 19305822.9 filed Jun. 24, 2019, the entire contents of each of which are hereby incorporated by reference.

BACKGROUND OF THE INVENTION

Field of the Invention

The present disclosure relates to a system and method for selecting an ophthalmic lens manufacturing process.

Description of the Related Art

Several entities are usually involved in the manufacturing of an ophthalmic lens.

Typically, based on a prescription as well as on data relating to a frame chosen by the client and possibly relating to other requirements such as a given tint and/or specific coatings of the ophthalmic lens, an eye care professional such as an optician orders an ophthalmic lens to a commercial entity, which then dispatches the received order to a production site such as a laboratory, where the ophthalmic lens is manufactured.

Ophthalmic lenses are usually manufactured using a surfacing process, which may be traditional or digital surfacing. The surfacing process comprises several steps such as lens picking, blocking, surfacing, polishing and engraving.

Once it is surfaced, the ophthalmic lens may receive added values such as tinting, hard coat, anti-reflection, etc. The ophthalmic lens can then be edged to the desired shape.

The ophthalmic lens also needs to be measured and controlled, in order to be compliant with patient needs and standards.

Different data flows describe the communication between the different actors and systems involved in the whole chain of production, mainly for surfacing, edging and control.

Usually, a management system which can be called the Lens Design and Process System or LDPS is able to define or "calculate" the ophthalmic lens, in two different ways:
  either an approximate and fast way, in order to evaluate the feasibility, the conformity to the patient needs and standards and/or the references of consumables, known as semi-finished lenses, present in stock, needed to produce the ophthalmic lens. The available data do not make it possible to manufacture the ophthalmic lens, but give enough details to simulate its geometry (curvatures, thickness, global shape, etc.);
  or a full and complete calculation, in order to produce the data which are necessary to manufacture the ophthalmic lens. This might require the knowledge, by the LDPS, of the specific equipment items available at the production site, their specific configurations and additional product-related information. Returned information contain the precise final geometry of the ophthalmic lens, the type of semi-finished lens to be used and after the complete information for all manufacturing steps, including data ready to be processed by the manufacturing machines.

In both cases, this data is returned to the calling entity i.e. the entity which asked the LDPS, often a laboratory, for the calculation and such entity has to integrate the data into its data flow, to use them appropriately according to the calculation level and to make them available upon request to the equipment items.

The LDPS also has ways to track the jobs and keep history of the information that is received by and/or sent back to the calling entity. The LDPS also allows access to and/or produces data for other systems for support and billing, among others.

In some cases, the LDPS can also send part of the information to a third system, either local or remote (e.g. on the Internet), which will be used for storing the information. This is particularly useful, but not restricted to, information that has to be protected and the transfer of which has to be limited as much as possible. In such cases, the data may be fetched as necessary from that third system directly by the equipment item or other system once it is allowed to do so.

For a particular ophthalmic lens order, it may be necessary to choose between several manufacturing processes for manufacturing the ophthalmic lens, in case the lens may be obtained through more than one manufacturing process, where all of those processes carry out the same set of operations, but differ mainly based on having semi-finished lenses with different curvatures of the front face or different diameters. The other parameters that could vary (index/optical design . . . ) are generally already fixed by the ordering party.

The selection of a particular manufacturing process may depend on several criteria, such as the types of manufacturing equipment and stock which are available in the production sites that are capable of manufacturing the ordered ophthalmic lens, for example.

The decision of choosing one manufacturing process among others may be taken either by the eye care professional, or by the production site with or without the eye care professional, mainly for stock management reasons.

When only a small number of manufacturing processes are available, such as two or three, and as their varying parts are of limited scope and have limited impact on other parts of the process or even on the final product, they can be determined manually and the selection of one of those manufacturing processes is easy to make.

The situation is not the same in the field of additive manufacturing, also known as 3D printing.

Additive manufacturing is a manufacturing technique defined in international standard ASTM 2792-12 and designates a process for assembling elements of material to obtain a solid three-dimensional object on the basis of a digital three-dimensional model (typically represented by data of a CAD file, CAD standing for "Computer-Aided Design").

Such a process is sometimes referred to as 3D printing or material printing because successive elements (e.g. layers) of materials may be deposited in succession one on the precedent. The layers, which correspond to virtual cross sections extracted from the three-dimensional model, are assembled and fused in order to form the solid three-dimensional object, here an optical part comprising an ophthalmic lens and a holder.

The expression "additive manufacturing" especially designates processes that create solid objects by juxtaposing volume elements or voxels. The term "juxtaposing" is understood to mean sequential operations, for example especially deposition of a layer on the precedent, or the deposition of a voxel making contact with or nearby a voxel deposited beforehand.

Moreover, the term "voxel" is understood to mean an individual element that, in combination with other voxels, defines an intermediate element, a layer for example. The term "voxel" may also apply to an intermediate element, for example a layer, in particular when stereolithography techniques are used.

Thus, depending on the additive manufacturing technique used, the optical lens will possibly be produced voxel by voxel, line by line or layer by layer.

The additive manufacturing method used may be selected in, but is not limited to, the list consisting of inkjet printing, stereolithography, mask stereolithography or mask projection stereolithography, material (such as polymer) jetting, scanning laser sintering (SLS), scanning laser melting (SLM) and fused deposition modeling (FDM).

Namely, various families of additive manufacturing technologies are known: DLP-SLA (Digital Light Processing Stereolithography) and material jetting, also known as inkjet printing, or even fused deposition modeling (FDM), etc.

According to DLP-SLA, an image of a slice of the part to print is projected on a liquid resin vat surface in order to print a layer. After each layer is formed, the part is moved vertically to print a new layer. The part can be moved above or inside the vat. The printing includes a support for the part.

According to material jetting, the part is printed drop by drop. Similarly to inkjet paper printing, the system can use printing heads which include multiple drop ejectors. It usually also includes an UV curing system to fix each drop where it is printed.

However, each of these families of technologies, in particular DLP-SLA and material jetting, includes numerous variants in the equipment, processes and materials used, as well as in the manufacturing processes implemented. Examples of such variations of additive manufacturing processes are: parameters inherent to each variant of each technology such as inherent thickness or size of layers and/or drops, fluidic and mechanical properties of materials or different strategies to manufacture lenses using said variants of technology such as lenses fully manufactured by 3D printing to their final shape or needing further edging processes; lenses manufactured by build-over additive manufacturing i.e. building the additive manufacturing part of the lens upon an existing lens or a transfer carrier, such manufacturing being possibly followed by traditional surfacing and possibly also followed by finishing and edging; lens blanks fully manufactured by 3D printing which then undergo traditional surfacing as well as finishing and edging, either all or only some of the traditional steps being necessary (e.g. engraving may not be necessary any more).

Thus, the possibility of combining additive manufacturing techniques with traditional manufacturing techniques creates numerous additional variants to manufacturing processes. Several combinations will arise depending in particular on the complexity of the lens, on the processes and machines available at the production site, on the material used, etc. These additive and subtractive process combinations can be viewed as hybrid processes.

Additionally, depending on the manufacturing process which will be used, the obtained lens (for instance its thickness) may be different.

Therefore, it becomes impossible to determine manually all the possible manufacturing processes and to select an ophthalmic lens manufacturing process among such a large variety of manufacturing processes.

SUMMARY OF THE INVENTION

An object of the disclosure is to overcome the above-mentioned drawbacks of the prior art.

To that end, the disclosure provides a system for selecting at least one ophthalmic lens manufacturing process to be used for manufacturing an ophthalmic lens, the manufacturing including additive manufacturing, remarkable in that it comprises:
  at least one processor configured to determine in an automated manner, on the basis of a set of input data, at least two ophthalmic lens manufacturing processes differing by at least one manufacturing operation, which can be used for manufacturing the ophthalmic lens; and
  at least one processor configured to select at least one ophthalmic lens manufacturing process to be used for manufacturing the ophthalmic lens, among the determined at least two ophthalmic lens manufacturing processes.

Therefore, the disclosure makes it possible to determine in a quick and easy automated manner a list of manufacturing processes that can be used for manufacturing an ordered ophthalmic lens, even if a very large variety of manufacturing processes can be envisioned due to the great number of available additive manufacturing and traditional manufacturing techniques and combinations between additive manufacturing techniques and traditional techniques.

Moreover, the disclosure makes it possible to easily and quickly select one or more particular manufacturing process (es) in the determined list of possibilities.

The disclosure also provides a method for selecting at least one ophthalmic lens manufacturing process to be used for manufacturing an ophthalmic lens, the manufacturing including additive manufacturing, remarkable in that it comprises steps of:
  determining in an automated manner, on the basis of a set of input data, at least two ophthalmic lens manufacturing processes differing by at least one manufacturing operation, which can be used for manufacturing the ophthalmic lens; and
  selecting at least one ophthalmic lens manufacturing process to be used for manufacturing the ophthalmic lens, among the determined at least two ophthalmic lens manufacturing processes.

As the method according to the disclosure has the same advantages as the system, they are not repeated here.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DESCRIPTION OF THE PREFERRED EMBODIMENTS

In the description which follows, although making and using various embodiments are discussed in detail below, it should be appreciated that as described herein are provided many inventive concepts that may embodied in a wide variety of contexts. Embodiments discussed herein are merely representative and do not limit the scope of the disclosure. It will also be obvious to one skilled in the art that all the technical features that are defined relative to a process can be transposed, individually or in combination, to a device and conversely, all the technical features relative to a device can be transposed, individually or in combination, to a process and the technical features of the different embodiments may be exchanged or combined with the features of other embodiments.

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises", "has", "contains", or "includes" one or more steps or elements possesses those one or more steps or elements, but is not limited to possessing only those one or more steps or elements.

The processor(s) within the terms of the disclosure may comprise dedicated hardware as well as hardware capable of executing software in association with appropriate software. This may consist in a single dedicated processor, a single shared processor, or a plurality of individual processors, some of which may be shared. Moreover, explicit use of the term "processor" should not be construed as referring exclusively to hardware capable of executing software, but refers in a general way to a processing device, which can for example include a computer, a microprocessor, an integrated circuit, or a programmable logic device (PLD). Additionally, the instructions and/or data enabling to perform associated and/or resulting functionalities may be stored on any processor-readable medium such as e.g. an integrated circuit, a hard disk, a CD (Compact Disc), an optical disc such as a DVD (Digital Versatile Disc), a RAM (Random-Access Memory) or a ROM (Read-Only Memory). Instructions may be notably stored in hardware, software, firmware or in any combination thereof.

A system according to the disclosure is for selecting one or several manufacturing processes for manufacturing an ophthalmic lens.

The manufacturing considered within the context of the disclosure comprises at least manufacturing by additive manufacturing at least a part of the ophthalmic lens, in a considered manufacturing machine or manufacturing system.

The system comprises at least one processor configured to determine manufacturing processes and at least one processor configured to select at least one manufacturing process within a set of at least two manufacturing processes.

By a processor configured to accomplish a task, it is meant a processor which comprises software and/or hardware enabling to enact the calculations necessary for accomplishing said task.

Thus, at least one processor is configured to determine in an automated manner, on the basis of a set of input data, at least two different ophthalmic lens manufacturing processes which can be used for manufacturing the ophthalmic lens.

Two ophthalmic lens manufacturing processes are defined as being "different" if they differ by the nature of at least one operation i.e. the two "differing" operations do not have the same function in the manufacturing process or do not use the same manufacturing tools for realizing said function. By contrast, two variations of a same manufacturing process with for example only a change in the semi-finished lens front curvature or diameter are not considered as two different manufacturing processes. However, two manufacturing processes processing two different materials, which would result in producing two lenses having a different shape, are considered as two different processes.

Further, at least one processor is configured to select, in an automated manner, at least one ophthalmic lens manufacturing process to be used for manufacturing the ophthalmic lens, among the at least two different ophthalmic lens manufacturing processes determined by the at least one processor configured to do so.

The at least one processor configured to select at least one manufacturing process within a set of at least two manufacturing processes may be integrated in the considered manufacturing machine or manufacturing system, or may be present in at least one external entity and/or at least one server configured to manage data from said external entity and communicate with the considered manufacturing machine or manufacturing system through an external network.

At least part of the set of input data may be stored in a database of the system according to the disclosure, directly accessible by the at least one processor configured to determine manufacturing processes. In that case, the database may be on a same computer or server as the at least one processor configured to determine manufacturing processes. As a variant, at least part of the set of input data is received by the at least one processor configured to determine manufacturing processes, upon request to one of the at least one external entity and/or at least one server configured to manage data from said external entity. The external entity may be a manufacturing plant or a machine of said manufacturing plant and/or may represent an optician or other eye-care professional or a lens ordering entity.

The set of input data may comprise at least in part lens input data which may be received from an external entity such as one representing an optician or other eye-care professional or any other lens ordering entity and at least in part one or more sets of manufacturing data which may be retrieved from a database of the system or subunits of said system or from a manufacturing plant or machine and/or a server configured to manage data from said manufacturing plant or machine.

In a particular embodiment, the set of lens input data comprises information relating to the ophthalmic lens to be manufactured.

By way of non-limiting example, the set of lens input data may relate to the geometry of the ophthalmic lens and may include, in addition to the prescription parameters (sphere, cylinder, axis, addition, prism value and orientation, etc.), the actual lens design product chosen, the geometry of the front and rear faces of the ophthalmic lens, a contour shape and/or the thickness of the ophthalmic lens, the optical refraction index of the lens, as well as fitting information, such as the pentoscopic and/or wrap angle, sizes A and B, etc. and/or data related to a paired lens, paired to the ophthalmic lens to manufacture and destined to be mounted in the same frame, for a same customer.

In a particular embodiment, the set of lens input data may also include added values functions such as anti-scratch, anti-reflection, tinting, photochromic, polarization, etc. and/or parameters relating to the morphology of the wearer such as the distance between the eyes. It may also include frame mounting information, such as the shape of the nosepads, a 2D or 3D shape and/or position of the trench or bevel of mounting holes, etc.

The set of manufacturing input data comprises information relating to the theoretically available manufacturing processes or machines.

In a particular embodiment, the set of manufacturing input data may comprise data about the additive manufacturing machines available in at least one manufacturing plant, their characteristics and/or data about their technical capabilities, and possibly about other manufacturing machines available in said at least one manufacturing plant, their availability and/or technical capabilities, etc.

The set of manufacturing data may further comprise for example pre-processing information (for instance, in case of additive manufacturing build-over, picking of the carrier, procedure for cleaning, positioning and holding the carrier, preparation of the additive manufacturing machine, material, supports, etc.), post-processing information (for example, information to post-cure if necessary, to eliminate temporary support structures, finishing processes such as polishing, etc.) and whether the lens can be manufactured on the basis of a lens that already exists or whether a totally new lens should be manufactured.

In addition to the above-mentioned parameters, in a particular embodiment, the set of input data may also comprise preference criteria supplied to the at least one processor configured to determine at least two different manufacturing processes by an eye care professional that ordered the lens. Such preference criteria may for example relate to the maximum cost of the lens, the maximum time needed to receive the manufactured lens and/or the desired minimum level of optical quality of the lens.

In a particular embodiment, the set of lens input data may also comprise information relating to mandatory permanent markings to be made on the lens (lens designer, addition for progressive designs, centering markings, etc.), branding, personalization (initials, drawing, etc.), special markings for lens tracking and identification (data matrix, barcodes, etc.).

In a particular embodiment, the set of input data may also comprise information for measuring and controlling the final lens, according to the chosen standards and adapted to the equipment to be used for control.

The above examples of information that may be comprised in the set of input data are not limiting and their list is therefore not exhaustive.

On the basis of the set of input data and knowing the technical capabilities in terms of equipment (additive manufacturing machines, traditional surfacing equipment, finishing equipment, control/measurement machines as well as the configurations of such equipment items) and materials available, the at least one processor configured to determine at least two different manufacturing processes automatically calculates the characteristics or "recipes" of at least two manufacturing processes that can be implemented for manufacturing the ophthalmic lens using at least in part an additive manufacturing process. In so doing, it determines at least one and preferably two manufacturing processes available using the manufacturing input data. In an embodiment, the at least one processor configured to determine at least two different manufacturing processes calculates all manufacturing processes that can be implemented for manufacturing the ophthalmic lens while using for each process only machines of a same manufacturing plant.

The at least one processor configured to determine at least two different manufacturing processes may refer to a set of preexisting types of manufacturing processes present in the database and the determination may then be based on identifying which of the set of types of manufacturing processes may be enabled based on the input data.

Furthermore, the at least one processor configured to determine at least two different manufacturing processes may calculate or determine the specificities of the manufacturing processes thus determined and/or the specificities of the ophthalmic lens which would be manufactured using said determined at least two different manufacturing processes.

It is assumed that the set of input data leads to calculation of at least two different ophthalmic lens manufacturing processes.

In a particular embodiment, the at least one processor configured to select at least one manufacturing process applies a predetermined cost function to the different ophthalmic lens manufacturing processes determined by the at least one processor configured to determine at least two different manufacturing processes. The resulting cost function values correspond respectively to the different ophthalmic lens manufacturing processes determined by the at least one processor configured to determine at least two different manufacturing processes and/or to the different ophthalmic lenses which would be manufactured by said ophthalmic lens manufacturing processes.

The values used within the cost function calculation may be calculated by the at least one processor configured to select at least one manufacturing process. Alternatively, these values may be calculated by the at least one processor configured to determine at least two different manufacturing processes while determining the specificities of the manufacturing processes which are determined or those of the ophthalmic lens which would be manufactured using such manufacturing processes. In a further alternative, the values used within the cost function calculation may be attributed by the at least one processor configured to select at least one manufacturing process, based on previous values calculated by the at least one processor configured to determine at least two different manufacturing processes.

Namely, the at least one processor configured to select at least one manufacturing process is adapted to compare the various cost function values and to select at least one ophthalmic lens manufacturing process which corresponds to the lowest cost function value.

In a particular embodiment, the cost function may be based on multiple factors taken among the expected manufacturing cost, the expected manufacturing time duration, the expected amount of cosmetic defects of the lens, the expected type and quantity of material consumed upon manufacturing, the expected weight and/or thickness of the lens, and the expected optical quality level of the lens manufactured according to each ophthalmic lens manufacturing process. The resulting value of the cost function may for example be a weighted sum of such factors, possibly combined with other factors.

In the example described below, the at least one processor configured to determine at least two different manufacturing processes determines that four different ophthalmic lens manufacturing processes can be implemented for manufacturing the ophthalmic lens: DLP-SLA horizontal printing, which is referred to as process 1, DLP-SLA vertical printing, which is referred to as process 2, inkjet full-lens printing, which is referred to as process 3 and inkjet patch printing, which is referred to as process 4.

The main steps of process 1 are as follows. The lens is printed horizontally, using the stereolithography technology, with supports being positioned on the lower end of the main face of the lens that is sensibly horizontal. The lens is formed directly with a shape fitting into the frame, so that no edging step is necessary. After lens printing, the upper face of the lens is polished in order to provide the desired transparency. Next, a blocking step sets a referential and the upper surface of the lens is clamped. Then, the lower face of the lens previously in contact with the supports and corresponding to a back face of the lens when presented on a frame, is machined and polished and the lens is eventually unblocked.

The main steps of process 2 are as follows. The lens is printed vertically, using the stereolithography technology, with supports being positioned on the edge of the lens. The lens is formed directly with a shape fitting into the frame, so that no edging step is necessary. After lens printing, supports are used for clamping the lens and surfaces are polished sequentially. Next, supports are removed and a degating step is carried out, followed for example by polishing of the edge of the ophthalmic lens. Optionally, the lens surface may further be protected by a film. This can be done so as to provide added values, such as tinting, hard coat, etc.

The main steps of process 3 are as follows. The lens is printed horizontally using a polymer jetting technology. This is done in two steps, in order to avoid using supports. In particular, in the present example, a first part of the lens is produced on a flat surface of a supporting plane. After forming the first part, it is then flipped over and a second part of the lens is manufactured by polymer jetting on the surface of the first part previously in contact with the support plane. The obtained lens has a contour which is close to the frame shape. After lens printing, a step of edging is performed, which is a light operation for creating a profile with possible grooves, bevels, etc.

The main steps of process 4 are as follows. After a first step of picking a support lens from an inventory, a patch is printed horizontally on a support film. Next, a lamination step transfers the patch on a face of the support lens which would be facing the wearer when mounted on a frame. A further step of edging enables fitting the lens into the frame, by removing the external part of the support lens, which may be done after providing added values such as tinting, hard coat, etc.

In the example, the cost function is based on the following factors:
- a service factor, defined as the time required to deliver the lens;
- a sustainability factor, defined as the ratio between the amount of waste material and the amount of effective product;
- a perceived quality factor, defined as a consumer perception linked to lens features, such as haze, contrast level, diffractive effects, etc. The perceived quality factor may also comprise the above-mentioned expected optical quality level and/or the above-mentioned expected amount of cosmetic defects of the lens. According to the present disclosure, the fact that the cost function takes into account the perceived quality factor, that is to say, optical quality aspects as well as geometrical aspects, makes it possible to predict the comfort of the wearer of the lens, using, as comparison data, data resulting from measurements of haze, contrast level, diffractive effects, etc. and/or data given by panels of trained wearers and/or preexisting data gathered in one or more databases. Such comparison data make it possible to automatically classify the different available manufacturing processes in view of selecting the most appropriate process. By way of non-limiting example, if haze exceeds a predetermined threshold when using a considered manufacturing process, the perceived quality factor will automatically predict that the optical quality of the lens obtained by using that considered manufacturing process is lower than when using another manufacturing process for which haze is below the above-mentioned threshold;
- a thickness factor, defined as the maximal thickness inside the expected contour, which is the frame if known, or circumscribed shapes such as a circle, an ellipse, a rectangle, etc.;
- a lens weight factor, defined as the estimated weight of the lens with the expected contour, which is the frame if known, or circumscribed shapes such as a circle, an ellipse, a rectangle, etc.;
- an operational cost factor, defined as the cost of consumables (including the cost of the treatment of waste material), operators, capitalization for maintenance, etc.;
- a capital cost factor, defined as the investments cost part of the lens production cost; it would be minimized by a maximal use of said process and the machines it makes use of; and
- a quality level factor, defined as the capability of the process or workshop regarding expected tolerances of the lens; it gives the probability of not respecting the production cost or the service.

It is to be noted that any of the values given in the example merely reflect a current state of technology for a few types of machines and processes currently available to the inventors. Such values, in particular values of the perceived quality or of the quality level, may change if similar processes are implemented on different machines and/or if optimized processes are used.

Table 1 below details the values, in the respective units of each of the above factors, corresponding to the scale of scores assigned to those factors, namely, a minimum score of 1, a first quarter score of 3, a median score of 5, a third quarter score of 7 and a maximum score of 9. The lower the score, the lower the cost function and the better the property evaluated by the corresponding factor.

TABLE 1

| | Service (hours) | Sustainability (%) | Perceived quality (blind test notation) | Thickness (mm) |
|---|---|---|---|---|
| 1 | 2 | 0 | Best | 2 |
| 3 | 12 | 25 | Premium | 3 |
| 5 | 24 | 100 | Good | 5 |
| 7 | 48 | 500 | Acceptable | 8 |
| 9 | 72 | 1000 | Poor | 12 |

| | Lens weight (g) | Operational cost ($) | Capital cost ($) | Quality level (%) |
|---|---|---|---|---|
| 1 | 3 | 1 | 0.5 | 99.99 |
| 3 | 5 | 5 | 2 | 99.9 |
| 5 | 8 | 10 | 5 | 99 |
| 7 | 12 | 15 | 10 | 95 |
| 9 | 19 | 20 | 20 | 85 |

Two different cases, referred to as "case 1" and "case 2", are considered in the example, respectively for two lenses having a cylinder of 1.00 and different values of the refractive index of the material used, of the sphere, of the axis, of the addition and of the contour, as detailed in Table 2 below.

TABLE 2

| | Material index | Sphere | Cylinder | Axis | Addition | Contour |
|---|---|---|---|---|---|---|
| Case 1 | 1.5 | −3.00 | 1.00 | 0 | 0 | Circle 65 |
| Case 2 | 1.67 | 2.00 | 1.00 | 90 | 2.00 | Ellipse 60 × 40, off-center 2.5 |

Tables 3 to 6 below list, for cases 1 and 2, the values in the respective units of each of the above factors and the corresponding scores, for manufacturing processes 1 to 4 described above. Table 3 is for process 1, Table 4 is for process 2, Table 5 is for process 3 and Table 6 is for process 4.

As mentioned above, and as applicable to the tables below, the values may be determined by the at least one processor configured to determine at least two different manufacturing processes during said determination or while determining specificities of said manufacturing processes and of the lenses manufactured thereby. The at least one processor configured to determine at least one manufacturing process may thus either calculate each of said values, or may refer to a database for some of said values.

Furthermore, the score in the tables below may either be assigned based on the determined values by the at least one processor configured to determine at least two different manufacturing processes, or by the at least one processor configured to select at least one manufacturing process based on the values determined by the at least one processor configured to determine at least two different manufacturing processes and transmitted to the at least one processor configured to select at least one manufacturing process.

TABLE 3 process 1

| | | Service | Sustainability | Perceived quality | Thickness |
|---|---|---|---|---|---|
| Case 1 | Value | 48 | 50 | Acceptable | 5.4 |
| | Score | 7 | 4 | 7 | 5.5 |
| Case 2 | Value | 48 | 50 | Good | 3.05 |
| | Score | 7 | 4 | 5 | 3 |

| | | Lens weight | Operational cost | Capital cost | Quality level |
|---|---|---|---|---|---|
| Case 1 | Value | 13.5 | 8 | 12 | 98 |
| | Score | 7.5 | 4 | 7.5 | 6 |
| Case 2 | Value | 5.9 | 8 | 7 | 95 |
| | Score | 3.5 | 4 | 6 | 7 |

TABLE 4 process 2

| | | Service | Sustainability | Perceived quality | Thickness |
|---|---|---|---|---|---|
| Case 1 | Value | 36 | 25 | Good | 5.4 |
| | Score | 6 | 3 | 5 | 5.5 |
| Case 2 | Value | 36 | 25 | Premium | 3.05 |
| | Score | 6 | 3 | 3 | 3 |

TABLE 4-continued process 2

| | | Lens weight | Operational cost | Capital cost | Quality level |
|---|---|---|---|---|---|
| Case 1 | Value | 13.5 | 4 | 10 | 99.5 |
| | Score | 7.5 | 2.5 | 7 | 4 |
| Case 2 | Value | 5.9 | 4 | 6 | 98 |
| | Score | 3.5 | 2.5 | 5.5 | 5.5 |

TABLE 5 process 3

| | | Service | Sustainability | Perceived quality | Thickness |
|---|---|---|---|---|---|
| Case 1 | Value | 48 | 10 | Premium | 5.4 |
| | Score | 7 | 2 | 3 | 5.5 |
| Case 2 | Value | 48 | 10 | Acceptable | 3.05 |
| | Score | 7 | 2 | 7 | 3 |

| | | Lens weight | Operational cost | Capital cost | Quality level |
|---|---|---|---|---|---|
| Case 1 | Value | 13.5 | 2 | 20 | 99.9 |
| | Score | 7.5 | 2 | 9 | 3 |
| Case 2 | Value | 5.9 | 2 | 15 | 99 |
| | Score | 3.5 | 2 | 8 | 5 |

TABLE 6 process 4

| | | Service | Sustainability | Perceived quality | Thickness |
|---|---|---|---|---|---|
| Case 1 | Value | 12 | 0 | Good | 5.9 |
| | Score | 3 | 1 | 5 | 6 |
| Case 2 | Value | 18 | 25 | Poor | 3.75 |
| | Score | 4 | 3 | 9 | 4 |

| | | Lens weight | Operational cost | Capital cost | Quality level |
|---|---|---|---|---|---|
| Case 1 | Value | 15.4 | 3 | 3 | 99.9 |
| | Score | 8 | 2 | 4 | 3 |
| Case 2 | Value | 6.7 | 4 | 7 | 95 |
| | Score | 4 | 3.5 | 6 | 7 |

It is to be noted that another selecting system may assign other scores to the values or determine values for other factors, without changing the core of the teaching of the disclosure.

Based on all the above scores, for the ophthalmic lens case 1 and the ophthalmic lens case 2 and the above-described four manufacturing processes, three non-limiting examples are given below of possible cost functions as a weighted sum of the scores obtained for at least part of the factors.

Example 1 for case 1 in Table 7 below focuses on identifying the manufacturing process having the best production cost. Thus, a coefficient (or weight) 1 is assigned to the scores of the operational cost factor and a coefficient 2 is assigned to the scores of the quality level factor for calculating the cost function as the weighted sum of those two factors, while the other factors are not taken into account in the cost function.

TABLE 7

Case 1—Example 1: best production cost

| Factors | Service | Sustainability | Perceived quality | Thickness | Lens weight | Operational cost | Capital cost | Quality level | SUM |
|---|---|---|---|---|---|---|---|---|---|
| Coefficient | 0 | 0 | 0 | 0 | 0 | 1 | 0 | 2 | 3 |
| Process 1 | 7 | 4 | 7 | 5.5 | 7.5 | 4 | 7.5 | 6 | 16 |
| Process 2 | 6 | 3 | 5 | 5.5 | 7.5 | 2.5 | 7 | 4 | 10.5 |
| Process 3 | 7 | 2 | 3 | 5.5 | 7.5 | 2 | 9 | 3 | 8 |
| Process 4 | 3 | 1 | 5 | 6 | 8 | 2 | 4 | 3 | 8 |

The lowest cost function value for production cost is obtained for processes 3 and 4, which may thus be selected. As shown here and without being limited to this example, if two or more processes have a same result, it is possible to let an operator or customer make a final choice, or it is possible to integrate another parameter or use another cost function to compare the multiple processes having a similar cost function value.

Example 2 for case 1 in Table 8 below focuses on identifying the manufacturing process that would produce the lens having the best perceived quality. Thus, a coefficient 2 is assigned to the scores of the perceived quality factor and a coefficient 1 is assigned to the thickness factor and to the lens weight factor respectively, while the other factors are not taken into account in the cost function.

TABLE 8

Case 1—Example 2: best lens perceived quality

| Factors | Service | Sustainability | Perceived quality | Thickness | Lens weight | Operational cost | Capital cost | Quality level | SUM |
|---|---|---|---|---|---|---|---|---|---|
| Coefficient | 0 | 0 | 2 | 1 | 1 | 0 | 0 | 0 | 4 |
| Process 1 | 7 | 4 | 7 | 5.5 | 7.5 | 4 | 7.5 | 6 | 27 |
| Process 2 | 6 | 3 | 5 | 5.5 | 7.5 | 2.5 | 7 | 4 | 23 |
| Process 3 | 7 | 2 | 3 | 5.5 | 7.5 | 2 | 9 | 3 | 19 |
| Process 4 | 3 | 1 | 5 | 6 | 8 | 2 | 4 | 3 | 24 |

The lowest cost function value for the lens perceived quality is obtained for process 3, which is thus selected. In an embodiment of the disclosure which proposes that two processes be chosen in order to let an operator or customer make a final choice, processes 2 and 3 would be chosen.

Example 3 for case 1 in Table 9 below focuses on identifying the manufacturing process that would deliver the best performance/cost compromise. Thus, a coefficient 1 is assigned to the scores of each of the factors, which are all taken into account in the cost function.

TABLE 9

Case 1—Example 3: best performance/cost compromise

| Factors | Service | Sustainability | Perceived quality | Thickness | Lens weight | Operational cost | Capital cost | Quality level | SUM |
|---|---|---|---|---|---|---|---|---|---|
| Coefficient | 1 | 1 | 1 | 1 | 1 | 1 | 1 | 1 | 8 |
| Process 1 | 7 | 4 | 7 | 5.5 | 7.5 | 4 | 7.5 | 6 | 48.5 |
| Process 2 | 6 | 3 | 5 | 5.5 | 7.5 | 2.5 | 7 | 4 | 40.5 |
| Process 3 | 7 | 2 | 3 | 5.5 | 7.5 | 2 | 9 | 3 | 39 |
| Process 4 | 3 | 1 | 5 | 6 | 8 | 2 | 4 | 3 | 32 |

The lowest cost function value for best performance/cost compromise is obtained for process 4, which is thus selected. In an embodiment of the disclosure which proposes that two processes be chosen in order to let an operator or customer make a final choice, processes 3 and 4 would be chosen.

The cost functions of examples 1, 2 and 3 for case 2 in Tables 10, 11 and 12 below use the same coefficients as those indicated above for case 1, respectively in examples 1, 2 and 3.

TABLE 10

Case 2—Example 1: best production cost

| Factors | Service | Sustainability | Perceived quality | Thickness | Lens weight | Operational cost | Capital cost | Quality level | SUM |
|---|---|---|---|---|---|---|---|---|---|
| Coefficient | 0 | 0 | 0 | 0 | 0 | 1 | 0 | 2 | 3 |
| Process 1 | 7 | 4 | 5 | 3 | 3.5 | 4 | 6 | 7 | 18 |
| Process 2 | 6 | 3 | 3 | 3 | 3.5 | 2.5 | 5.5 | 5.5 | 13.5 |
| Process 3 | 7 | 2 | 7 | 3 | 3.5 | 2 | 8 | 5 | 12 |
| Process 4 | 4 | 3 | 9 | 4 | 4 | 3.5 | 6 | 7 | 17.5 |

The lowest cost function value for production cost is obtained for process 3, which is thus selected. In an embodiment of the disclosure which proposes that two processes be chosen in order to let an operator or customer make a final choice, processes 2 and 3 would be chosen.

TABLE 11

Case 2—Example 2: best lens perceived quality

| Factors | Service | Sustainability | Perceived quality | Thickness | Lens weight | Operational cost | Capital cost | Quality level | SUM |
|---|---|---|---|---|---|---|---|---|---|
| Coefficient | 0 | 0 | 2 | 1 | 1 | 0 | 0 | 0 | 4 |
| Process 1 | 7 | 4 | 5 | 3 | 3.5 | 4 | 6 | 7 | 16.5 |
| Process 2 | 6 | 3 | 3 | 3 | 3.5 | 2.5 | 5.5 | 5.5 | 12.5 |
| Process 3 | 7 | 2 | 7 | 3 | 3.5 | 2 | 8 | 5 | 20.5 |
| Process 4 | 4 | 3 | 9 | 4 | 4 | 3.5 | 6 | 7 | 26 |

The lowest cost function value for lens perceived quality is obtained for process 2, which is thus selected. In an embodiment of the disclosure which proposed that two processes be chosen in order to let an operator or customer make a final choice, processes 1 and 2 would be chosen.

TABLE 12

Case 2—Example 3: best performance/cost compromise

| Factors | Service | Sustainability | Perceived quality | Thickness | Lens weight | Operational cost | Capital cost | Quality level | SUM |
|---|---|---|---|---|---|---|---|---|---|
| Coefficient | 1 | 1 | 1 | 1 | 1 | 1 | 1 | 1 | 8 |
| Process 1 | 7 | 4 | 5 | 3 | 3.5 | 4 | 6 | 7 | 39.5 |
| Process 2 | 6 | 3 | 3 | 3 | 3.5 | 2.5 | 5.5 | 5.5 | 33 |
| Process 3 | 7 | 2 | 7 | 3 | 3.5 | 2 | 8 | 5 | 37.5 |
| Process 4 | 4 | 3 | 9 | 4 | 4 | 3.5 | 6 | 7 | 40.5 |

The lowest cost function value for best performance/cost compromise is obtained for process 2, which is thus selected. In an embodiment of the disclosure which proposes that two processes be chosen in order to let an operator or customer make a final choice, processes 2 and 3 would be chosen.

As can be seen when applying the principle of cost function of the disclosure to examples, the nature of the target ophthalmic lens, here case 1 or 2, may have an impact on the process which is most adapted in view of a particular cost function.

Indeed, if one aims at identifying the manufacturing process having the best production costs, using the exemplified cost functions, it is better to manufacture the ophthalmic lens of case 1 using process 4, whereas process 3 is better for the ophthalmic lens of case 2.

Further, if one aims at identifying the manufacturing process which would yield the best perceived quality of the lens to manufacture, using the exemplified cost functions, it is better to manufacture the ophthalmic lens of case 1 using process 3, whereas process 2 is better for the ophthalmic lens of case 2.

Furthermore, when one aims at identifying the manufacturing process which would provide a best compromise between costs and performances, using the exemplified cost functions, it is better to manufacture the ophthalmic lens of case 1 using process 4, whereas process 2 is better for the ophthalmic lens of case 2.

Thus, using the process of the disclosure enables to efficiently choose the most adapted manufacturing process for each ophthalmic lens to be manufactured based on a given chosen cost function, and thus for a given chosen criterion.

It is to be noted that in an embodiment, the operator or the customer selects the cost function that will be used by the at least one processor configured to select the at least one manufacturing process.

It is to be noted that in an embodiment where two or more manufacturing processes are selected, so as to enable an operator or a customer to make a final choice, it is possible to select the at least two processes reaching the lowest values for a given cost function. Alternatively, it is possible to present said operator or customer with the resulting manufacturing process having reached the lowest values for two or more different cost functions. For example, regarding the ophthalmic lens of case 1, it would be possible to display to an eye-care professional a proposition of a lens made by the process 3 with a better perceived quality and a proposition of a lens made by the process 4 with a better performance/cost compromise.

More generally, it would be possible to display to an eye-care professional at least a first proposition of a lens made by a first process with a first better cost function value, determined using a first cost function (aiming at identifying one of, for example, production cost, perceived quality, performance/cost compromise, etc.) and a second proposition of a lens made by a second process different from the first process with a second better cost function value, determined using a second cost function different from the first cost function. The lens would then be manufactured using the process chosen by the eye-care professional among the various propositions.

Figure 1:
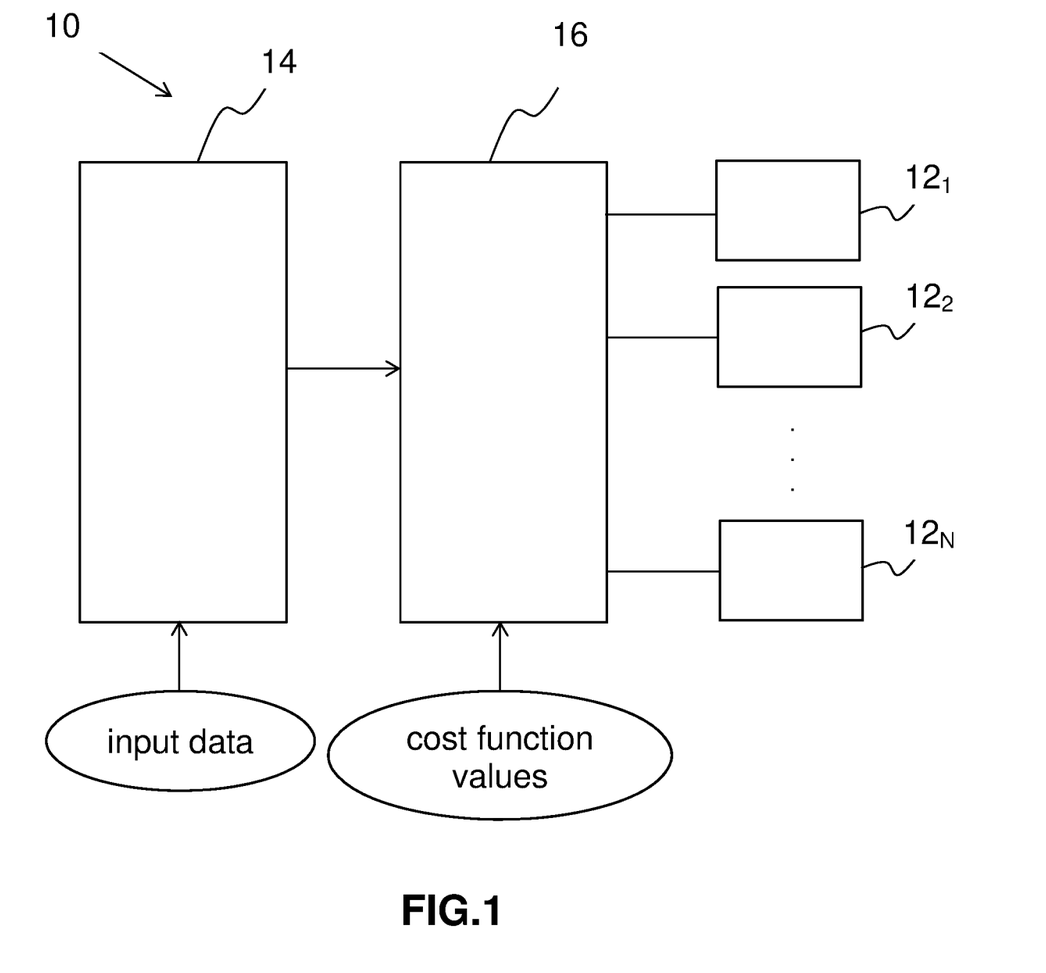
FIG. 1 is a schematic view of a system for selecting an ophthalmic lens manufacturing process according to the disclosure, in a particular embodiment.

As shown in FIG. 1, in a particular embodiment, a system 10 according to the disclosure for selecting at least one ophthalmic lens manufacturing process to be used for manufacturing an ophthalmic lens comprises a plurality of N candidate manufacturing sites $12_1$ to $12_N$. The candidate manufacturing sites $12_1$ to $12_N$ are for example laboratories or plants provided with equipment and materials for manufacturing ophthalmic lenses.

At least one candidate manufacturing site among sites $12_1$ to $12_N$ is an additive manufacturing site.

According to the disclosure, the system 10 comprises at least one processor 14 configured to determine in an automated manner at least two different ophthalmic lens manufacturing effective processes which can be implemented by at least one of the candidate manufacturing sites $12_1$ to $12_N$.

In other words, the determined at least two different ophthalmic lens manufacturing processes can be implemented, either by two or more different manufacturing sites among sites $12_1$ to $12_N$, or by the same manufacturing site among sites $12_1$ to $12_N$, but using two different machines present on that same site, or using a same machine in two different ways.

The at least one processor 14 configured to determine at least two different manufacturing processes may be comprised in an LDPS.

For determining the at least two different ophthalmic lens manufacturing effective processes which can be implemented by at least one of the candidate manufacturing sites $12_1$ to $12_N$, the at least one processor 14 configured to determine at least two different manufacturing processes uses a set of input data.

In a particular embodiment, at least part of the set of input data is stored in a database which is contained in a calculation unit comprising said at least one processor 14 configured to determine at least two different manufacturing processes. As a variant, at least part of the set of input data is received by the at least one processor 14 configured to determine at least two different manufacturing processes.

The set of input data comprises at least in part lens input data received from an external entity (not shown), through a receiver (not shown) contained in the at least one processor 14 configured to determine at least two different manufacturing processes, and at least in part manufacturing data from a database of the system 10 or subunits of said system 10 or from databases or servers configured to manage data from the at least two different candidate manufacturing sites $12_1$ to $12_N$ or their machines. Namely, the database may be located in a centralized place or may be located in one or more of the candidate manufacturing sites $12_1$ to $12_N$.

Information transfers between the at least one processor 14 configured to determine at least two different manufacturing processes and the candidate manufacturing sites $12_1$ to $12_N$ may be handled by a Laboratory Management System (LMS), which is known per se.

In the embodiment illustrated by FIG. 1, the set of manufacturing input data comprises information relating to the theoretically available manufacturing processes of the additive manufacturing site among sites $12_1$ to $12_N$.

On the basis of the set of input data and knowing the technical capabilities of each of the candidate manufacturing sites $12_1$ to $12_N$ in terms of equipment (additive manufacturing machines, traditional surfacing equipment, finishing equipment, control/measurement machines as well as possibly data relative to the configurations of such equipment items) and materials available, the at least one processor 14 configured to determine at least two different manufacturing processes automatically calculates the characteristics or "recipes" of all the manufacturing processes that can be implemented by at least one candidate manufacturing site for manufacturing the ophthalmic lens. The at least one processor 14 configured to determine at least two different manufacturing processes may further calculate the characteristics of the ophthalmic lens that would be thus manufactured.

In so doing, it determines at least one and preferably two manufacturing processes available using the manufacturing input data. In an embodiment, the at least one processor 14 configured to determine at least two different manufacturing processes calculates all manufacturing processes that can be implemented for manufacturing the ophthalmic lens while using for each process only machines of a same manufacturing plant.

The at least one processor 14 configured to determine at least two different manufacturing processes may refer to a set of preexisting types of manufacturing processes present in the database and the determination may then be based on identifying which of the set of types of manufacturing processes may be enabled based on the input data.

It is assumed that the set of input data and the plurality of candidate manufacturing sites $12_1$ to $12_N$ lead to calculation of at least two different ophthalmic lens manufacturing processes.

The system 10 further comprises at least one processor 16 configured to select at least one manufacturing process, which is adapted to select at least one ophthalmic lens manufacturing process to be used for manufacturing the ophthalmic lens, among all the manufacturing processes determined by the at least one processor 14 configured to determine at least two different manufacturing processes.

In a particular embodiment, the at least one processor 16 configured to select at least one manufacturing process applies a predetermined cost function to the different ophthalmic lens manufacturing processes determined by the at least one processor 14 configured to determine at least two different manufacturing processes. The resulting cost function values correspond respectively to the different ophthalmic lens manufacturing processes determined by the at least one processor 14 configured to determine at least two different manufacturing processes.

Namely, the at least one processor 16 configured to select at least one manufacturing process is adapted to compare the various cost function values and to select at least one ophthalmic lens manufacturing process which corresponds to the lowest cost function value.

In an embodiment, a user may input data in the at least one processor 16 configured to select at least one manufacturing process directly or indirectly so as to choose a particular factor or cost function to use to apply the process of the disclosure.

In a further embodiment, based on the results of applying one or more cost functions to the two or more different manufacturing processes, two or more processes may be proposed to a user, while providing said user with respective values regarding one or more predetermined factors or cost functions. The user may then select a process for manufacturing the ophthalmic lens that is to be used for manufacturing the desired ophthalmic lens. The use of the process of the disclosure still applies as the amount of possible processes to compare is reduced to an amount of processes to choose from which is manageable for a user.

In a particular embodiment, the at least one processor 16 configured to select at least one manufacturing process is present in at least one of the candidate manufacturing sites $12_1$ to $12_N$. In that embodiment, the cost function may comprise factors depending on data taken among the stock of additive manufacturing material corresponding to a given ophthalmic lens manufacturing process available in a given candidate manufacturing site, the stock of semi-finished lenses and/or blank lenses available in a given candidate manufacturing site and corresponding to a given ophthalmic lens manufacturing process and a manufacturing duration for manufacturing the ophthalmic lens using the given ophthalmic lens manufacturing process, and/or data related to other lenses or pair of lenses to be manufactured within the same time period, especially if such manufacturing may impact some factor values, such as capital cost or similar. The resulting value of the cost function may for example be a weighted sum of such factors, as in the examples described above.

Usually, lenses are manufactured by pairs, so as to be mounted on a given frame and both lenses of the pair of ophthalmic lenses may not have the same optical function. Thus, in an embodiment, the different embodiments of the processes of the disclosure may be applied to both lenses of a given pair and the factors and/or cost functions may be applied to both lenses of said pair. In such an embodiment, it would be possible to propose the cost function values resulting for the pair of lenses.

Figure 2:
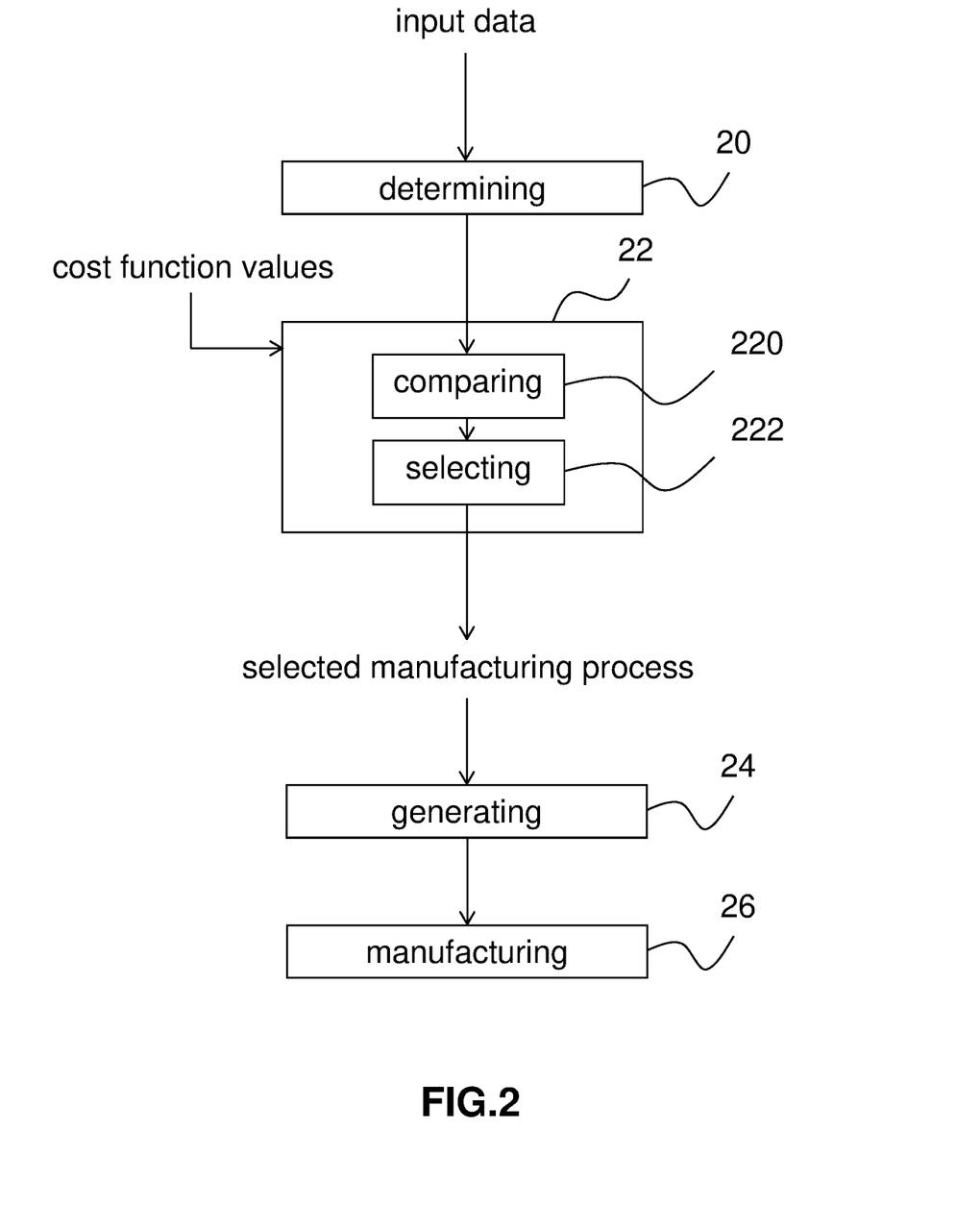
FIG. 2 is a flowchart showing steps of a method for selecting an ophthalmic lens manufacturing process according to the disclosure, in a particular embodiment.

As shown by the flowchart of FIG. 2, a method according to the disclosure for selecting at least one ophthalmic lens manufacturing process to be used for manufacturing an ophthalmic lens, where the manufacturing includes additive manufacturing, comprises a first step 20 of determining in an automated manner, on the basis of a set of input data, at least two different ophthalmic lens manufacturing processes which can be used for manufacturing a same target ophthalmic lens.

In a particular embodiment where there is a plurality of candidate manufacturing sites $12_1$ to $12_N$, at step 20, at least two different ophthalmic lens manufacturing processes are determined which can be implemented by at least one additive manufacturing site among the candidate manufacturing sites $12_1$ to $12_N$.

The set of input data is as described above in connection with the system according to the disclosure for selecting an ophthalmic lens manufacturing process.

The method comprises a second step 22 of selecting at least one ophthalmic lens manufacturing process to be used for manufacturing the ophthalmic lens, among the different ophthalmic lens manufacturing processes determined during the determining step 20.

In a particular embodiment, the selecting step 22 comprises a step 220 of comparing at least two cost function values corresponding to the results of applying a predetermined cost function to the different ophthalmic lens manufacturing processes determined at the determining step 20. The resulting cost function values correspond respectively to the different ophthalmic lens manufacturing processes determined during the determining step 20. The cost function values are defined as described above in connection with the system according to the disclosure. In that particular embodiment, the selecting step 22 also comprises a following step 222 of selecting at least one ophthalmic lens manufacturing process which corresponds to the lowest cost function value.

In the particular embodiment of FIG. 2, the selecting step 22 is followed by a step 24 of generating manufacturing instructions for the manufacturing machine(s) concerned, based on one of the ophthalmic lens manufacturing process(es) selected at the selecting step 22. In a particular embodiment where there is a plurality of candidate manufacturing sites $12_1$ to $12_N$, the manufacturing machine(s) concerned are located in one or more of the candidate manufacturing sites $12_1$ to $12_N$.

Then, in the particular embodiment of FIG. 2, during a manufacturing step 26, the target ophthalmic lens is manufactured by using one of the ophthalmic lens manufacturing process(es) selected at the selecting step 22, for example by carrying out the manufacturing instructions generated at the generating step 24.

Although representative systems and methods have been described in detail herein, those skilled in the art will recognize that various substitutions and modifications may be made without departing from the scope of what is described and defined by the appended claims.

The invention claimed is:

1. A system for selecting at least one ophthalmic lens manufacturing process to be used for manufacturing an ophthalmic lens, said manufacturing including additive manufacturing, the system comprising:
at least one processor configured to determine in an automated manner, based on a set of input data, at least two ophthalmic lens manufacturing processes differing by at least one manufacturing operation, the at least two ophthalmic lens manufacturing processes being able to be used to manufacture said ophthalmic lens;
at least one processor configured to:
weight at least one factor for each of the at least two ophthalmic lens manufacturing processes, the at least one factor being related to one of: (i) the respective ophthalmic lens manufacturing process and (ii) an ophthalmic lens parameter obtained from the respective ophthalmic lens manufacturing process,
calculate a respective cost function for each of the at least two ophthalmic lens manufacturing processes having the weighted at least one factor, and
select at least one ophthalmic lens manufacturing process to be used to manufacture said ophthalmic lens, among said determined at least two ophthalmic lens manufacturing processes, based on the respective calculated cost functions,
wherein the ophthalmic lens is manufactured by a manufacturing machine using the at least one selected ophthalmic lens manufacturing process.

2. The system according to claim 1, further comprising a plurality of candidate manufacturing sites, at least one candidate manufacturing site of said plurality of candidate manufacturing sites being an additive manufacturing site,
wherein said at least two determined ophthalmic lens manufacturing processes are able to be implemented by at least one additive manufacturing site of said plurality of candidate manufacturing sites.

3. The system according to claim 2, further comprising a database storing at least part of said set of input data.

4. The system according to claim 2, further comprising a receiver configured to receive at least part of said set of input data from an external entity.

5. The system according to claim 2, wherein said set of input data comprises a set of manufacturing input data comprising information relating to theoretically available manufacturing processes.

6. The system according to claim 1, further comprising a database storing at least part of said set of input data.

7. The system according to claim 6, further comprising a receiver configured to receive at least part of said set of input data from an external entity.

8. The system according to claim 1, further comprising a receiver configured to receive at least part of said set of input data from an external entity.

9. The system according to claim 1, wherein said set of input data comprises a set of manufacturing input data comprising information relating to theoretically available manufacturing processes.

10. The system according to claim 9, wherein said set of input data further comprises preference criteria supplied to said at least one processor configured to determine at least two different manufacturing processes by an eye care professional.

11. The system according to claim 1, wherein at least one factor is taken among the expected manufacturing cost, the expected manufacturing time duration, the expected amount of cosmetic defects of said lens, the expected type and quantity of material consumed upon manufacturing, the expected weight and/or thickness of said lens, and the expected optical quality level of said lens manufactured according to each manufacturing process.

12. The system according to claim 1, wherein said at least one processor configured to select said at least one ophthalmic lens manufacturing process is comprised in each candidate manufacturing site of said plurality of candidate manufacturing sites,
wherein the at least one factor depending on data taken among the stock of additive manufacturing material corresponding to a given ophthalmic lens manufacturing process available in a given candidate manufacturing site, the stock of semi-finished lenses and/or blank lenses corresponding to a given ophthalmic lens manufacturing process available in a given candidate manufacturing site and a manufacturing duration to manufacture said ophthalmic lens using said given ophthalmic lens manufacturing process, and/or data related to other lenses or pair of lenses to be manufactured within the same time period.

13. A method for selecting at least one ophthalmic lens manufacturing process to be used for manufacturing an ophthalmic lens, said manufacturing including additive manufacturing, the method comprising:
determining in an automated manner, based on a set of input data, at least two ophthalmic lens manufacturing processes differing by at least one manufacturing operation, the at least two ophthalmic lens manufacturing processes being able to be used to manufacture said ophthalmic lens;
weighting at least one factor for each of the at least two ophthalmic lens manufacturing processes, the at least one factor being related to one of: (i) the respective ophthalmic lens manufacturing process and (ii) an ophthalmic lens parameter obtained from the respective ophthalmic lens manufacturing process;
calculating a respective cost function for each of the at least two ophthalmic lens manufacturing processes having the weighted at least one factor;
selecting at least one ophthalmic lens manufacturing process to be used to manufacture said ophthalmic lens, among said determined at least two ophthalmic lens manufacturing processes, based on the respective calculated cost functions; and
manufacturing said ophthalmic lens, by using the at least one selected ophthalmic lens manufacturing process.

14. The method according to claim 13, wherein said at least two ophthalmic lens manufacturing processes are able to be implemented by at least one additive manufacturing site of a plurality of candidate manufacturing sites comprising at least one additive manufacturing site.

15. The method according to claim 13, wherein the at least one factor is taken among the expected manufacturing cost, the expected manufacturing time duration, the expected amount of cosmetic defects of said lens, the expected type and quantity of material consumed upon manufacturing, the expected weight and/or thickness of said lens, and the expected optical quality level of said lens manufactured according to each manufacturing process.

16. The method according to claim 13, wherein the at least one factor depends on data taken among the stock of additive manufacturing material corresponding to a given ophthalmic lens manufacturing process available in a given candidate manufacturing site, the stock of semi-finished lenses and/or blank lenses corresponding to a given ophthalmic lens manufacturing process available in a given candidate manufacturing site and a manufacturing duration to manufacture said ophthalmic lens using said given ophthalmic lens manufacturing process, and/or data related to other lenses or pair of lenses to be manufactured within the same time period.

17. The method according to claim 13, further comprising generating manufacturing instructions for at least one manufacturing machine, based on one of said at least one ophthalmic lens manufacturing process selected through said selecting at least one ophthalmic lens manufacturing process.

* * * * *